J. R. MYERS.
COMBINED INCUBATOR AND BROODER.
APPLICATION FILED APR. 4, 1917.
1,384,084.
Patented July 12, 1921.
2 SHEETS—SHEET 2.
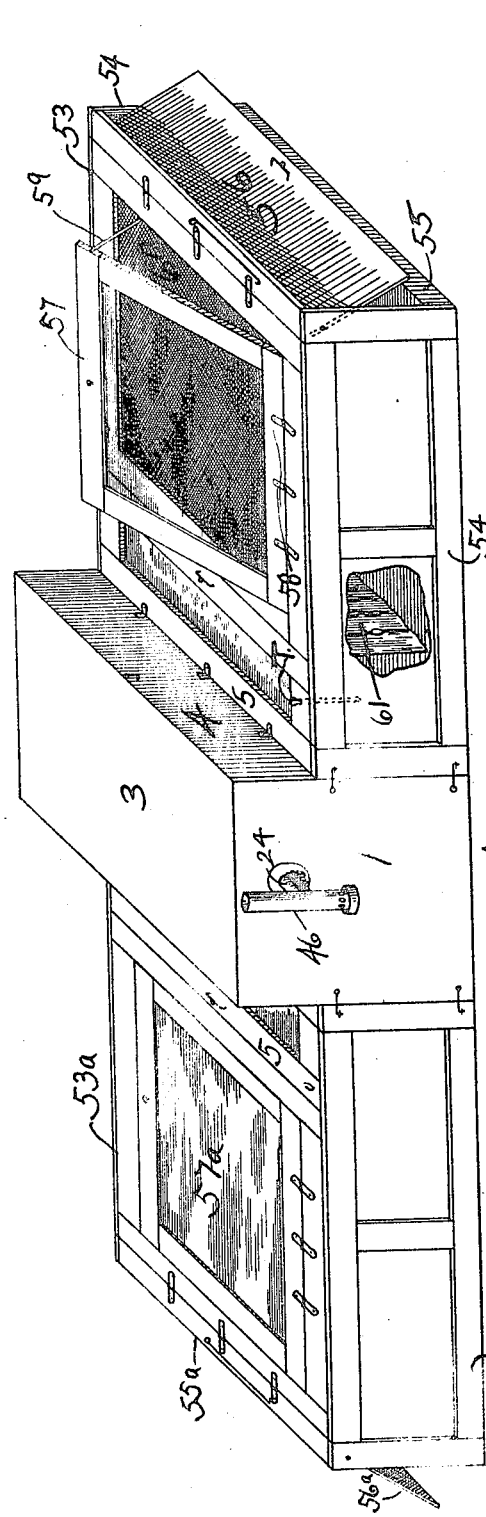
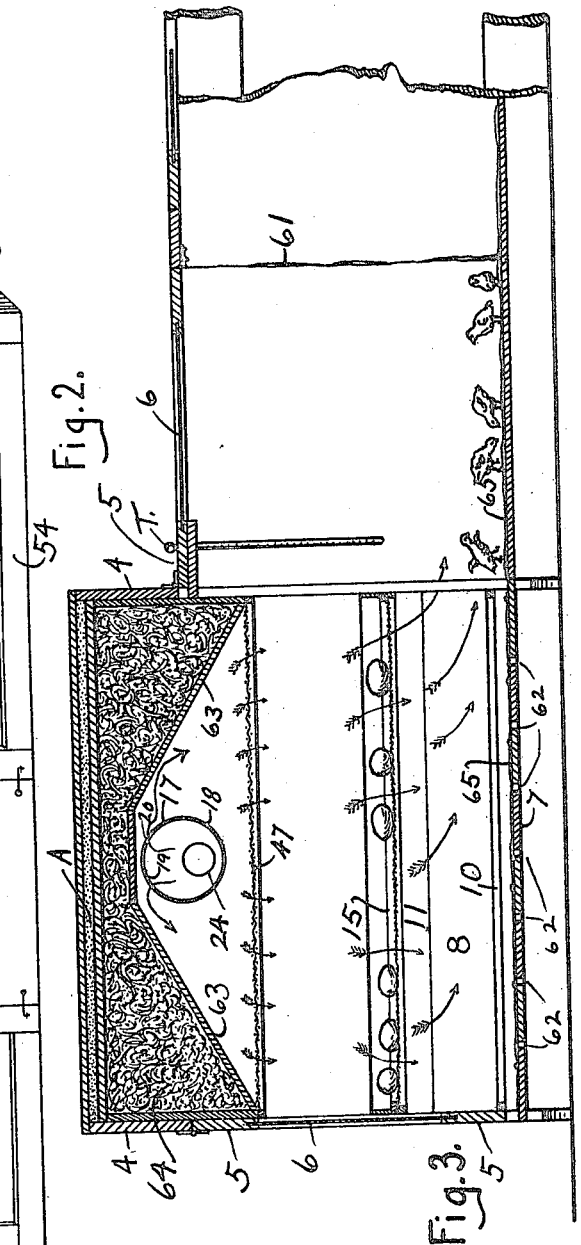
INVENTOR
John R. Myers
by his attorney
J. Edward Thebaud

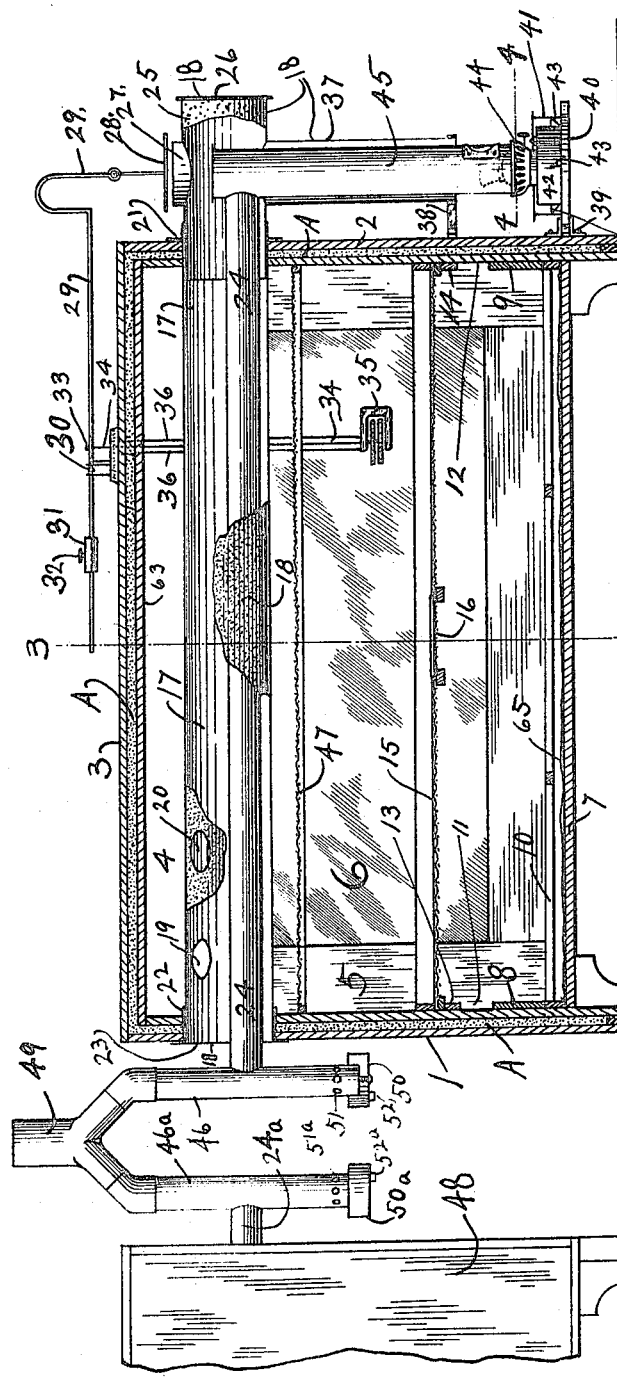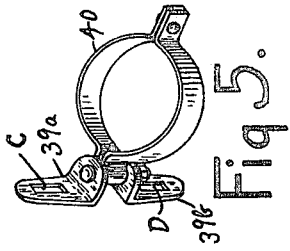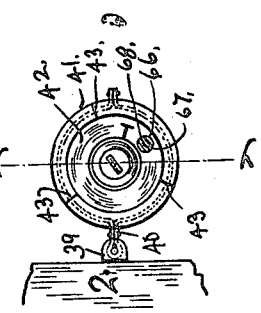

UNITED STATES PATENT OFFICE.

JOHN R. MYERS, OF BUFFALO, NEW YORK.

COMBINED INCUBATOR AND BROODER.

1,384,084.  Specification of Letters Patent.  Patented July 12, 1921.

Application filed April 4, 1917. Serial No. 159,841.

*To all whom it may concern:*

Be it known that I, JOHN R. MYERS, a citizen of the United States, residing at Buffalo, in the county of Erie and State of New York, have invented certain new and useful Improvements in Combined Incubators and Brooders; and I do hereby declare the following to be a full, clear, and exact description of the same, such as will enable others skilled in the art to which it appertains to make and use the same, reference being had to the accompanying drawings and to figures of reference marked thereon, which form part of this specification.

Like figures of reference refer to like parts.

My invention relates to combined incubators and brooders.

One object of this invention is to provide means forming an incubator, having a system of circulation of air, which is heated, and automatically distributed in a manner to preserve natural qualities of air circulated about the eggs, without resorting to a humidifier.

Another object is to provide a heating chamber within the body of the incubator, that shall be insulated from the air or the interior of the incubator, so as not to heat this air by radiation direct from the walls of said chamber, but rather from currents of warm air directed into said incubator from said chamber.

A further object is to provide an incubator with doors of such construction that they can be made available in partly forming a brooder, attached to the incubator.

A further object is to so simplify the construction of the incubator, as to reduce its cost without impairing its durability and efficiency.

With these and other objects in view, my invention consists in certain features of construction, one embodiment of which is illustrated in the drawings and is hereinafter described, and what I claim is set forth.

In the drawings,

Figure 1 is a sectional elevation of an incubator embodying my invention, showing also the fragment of an adjoining one; the two incubators being connected with a common chimney.

Fig. 2, is a perspective view of a combined incubator and brooder embodying my invention.

Fig. 3, is a sectional elevation of the incubator taken on the line 3—3 of Fig. 1, the section being taken transversely to the flue, which passes through the incubator from the heater.

Fig. 4, is a sectional plan of the heater shown in Fig. 1, taken on the line 4—4 of Fig. 1.

Fig. 5 is a perspective view of the swinging shelf and brackets.

In the figures, referring particularly to Fig. 1, 1 and 2 are the respective end walls of the incubator joined by the roof portion 3. These wall sections and the roof portion have a heat non-conductive filling A. The remaining side walls include stationary portions 4, to each of which is hinged a glass door 5, having a glass portion 6. A floor 7, has openings 62, provided in the lower part of the incubator. On the walls 1, and 2, are shown the respective cleats 8 and 9, fixed thereto. Between these cleats 8 and 9, and the floor 7, is slidably positioned a cloth covered tray 10, which is adapted to fit into the channels 11 and 12, above the respective cleats 8 and 9. Fixed to the walls 1 and 2, above the channels 11 and 12, are the respective brackets 13 and 14, which support the removable egg tray 15, which has a central transverse opening at 16, to permit chicks to drop through on to the tray 10. Passing through the upper part of the incubator, near the roof 2, is shown a horizontal drum 17, covered with some non-conductor of heat 18, such as asbestos. In the upper part of the drum 17, positioned near, but not at the top thereof, I provide openings 19 and 20, near the wall 1. In the wall 2, is a thimble 21, supporting the drum 17, which also seals any vent which the air might have through the wall 2, around the drum 17. In the wall 1, is a thimble 22, having a closed end 23, through which passes a vent pipe 24.

The drum 17, has an extension 25, which is covered permanently at 26. From the upper part of the extension 25, rises an open branch 27, for which a cover 28 is provided. This cover 28, is supported at the end of the lever 29, which is fulcrumed at 30, and balanced by the counter-weight 31, fixed by a screw 32. From the point 33, of the lever 29, is suspended a rod 34, which passes down into the body of the incubator, and connects with the thermostat 35, which is supported on fixed rods 36, 36. Depending from the drum extension 25, is the open pipe 37, fixed to the wall 2 by the bracket 38. Also fixed to the wall 2, is a bracket 39, to which is pivoted a lamp shelf 40, holding a pan 41, within which is positioned the reservoir 42, of the lamp, having projections 43, 43, for centrally positioning the reservoir 42, within the pan 41. Extending up from the chimney rest 44, is the pipe 45, passing up through and spaced from the pipe 37. The upper end of the pipe 45 is closed. Connecting the pipe 45, with the stack branch 46, is the vent pipe 24, passing through the lower portion of the covered drum 17. A heat disseminating and equalizing screen, preferably made of metal is shown at 47. 48 is a duplicate of the incubator just described, having a vent pipe 24ª, connected with a stack branch 46ª, which with the stack branch 46, communicates with the chimney 49. To the lower end of the stack branch 46, is suspended a cup 50, there being a space between the lower end of the stack branch 46, and the bottom of the cup 50. Positioned above the rim of the cup 50, is a series of vent holes 51, 51. Covering a hole in the bottom of the cup 50, is a cap 52, adapted to be removed, when releasing water, accumulated in the cup. Features numbered 50ª, 51ª, 52ª, are similar respectively to those numbered 50, 51, and 52, just described.

Referring to Fig. 2, the incubator is shown having an end wall 1, a roof 3, side walls 4, having doors 5, 5, lifted to partially form the respective roofs 53 and 53ª of the brooders, shown on either side of the incubator. The roof 53 is supported by the wall pieces 54, 54, and the end frame 55, to which is pivoted the door 56, in a manner to have its upper part swing in, as its lower part swings out, for ventilating purposes. The roof 53 has a glass section 57, hinged at 58, and is shown raised and supported by a rod 59. Below the opening in which the glass section 57 fits, is a wire screen 60.

The brooder section of which 53ª is the roof, is similar to that brooder section just described, having parts numbered 54ª, 55ª, 56ª, and 57ª, similar, respectively, to the other parts 54, 55, 56, and 57. Within each brooder section, there hangs a flexible sectional curtain, such as that marked 61, which extends downward from the roof 53, toward the floor of the brooder, permitting the chicks to pass through it, while at the same time acting to hold warm air in the incubator and separating the space into hover and brooder compartments.

The floor of the brooder-hatcher is covered with a removable canvas, which will be described in connection with Fig. 3. I provide a thermometer T, positioned to pass through one of the doors 5.

Referring to Fig. 3, openings in the floor 7 are shown at 62, 62. In this figure, the shape of the ceiling, of the incubator is shown having the ceiling boards 63, 63, and a packing of asbestos wool 64 above. In the apex of the ceiling space is shown the drum 18, within the lower part of which is shown the position of the vent pipe 24.

Only one side of the incubator is shown opened out in this figure to form, with other parts, a brooder similar to that shown on the right of Fig. 2. The floor of this combined incubator and brooder, is covered with a removable canvas 65, which I preferably secure by buttons or other fasteners, and cover the same with a litter.

Referring to Fig. 4 on the reservoir 42, of the lamp is shown a perforated screw cap 66, having a V-shaped hood 67, over the aperture 68.

In the perspective view of the swinging shelf 40, shown in Fig. 5, there appear two bracket parts, 39ª and 39ᵇ, slotted respectively, at C and D for the reception of bolts or screws for adjustably attaching the same to the wall 2 of the incubator shown in Figs. 1 and 4.

In operating the above described device as an incubator, the cloth tray 10 is raised to occupy the channels 11 and 12, beneath the respective brackets 13 and 14. This reduces the volume of air above the tray 10, to be heated during incubation. This tray 10 remains in the upper position, until a few days before hatching, when it is put back in the place, shown in the drawing, to receive chicks. Eggs are next placed in the tray 15, and the doors 5, 5, are closed down. The heating apparatus is next started. The shelf 40 is swung to one side, to remove the lamp, which, after being lighted, is replaced into the position shown in the figure, and the shelf 40 is swung back under to support the same. Fumes from the lamp will now pass up through the pipe 45, cross over through the vent pipe 24 and travel up the stack branch 46, and out the chimney 49. During the passage of the heated fumes through the pipes, the air within the pipe 37 and drum 17, becomes heated by radiation therefrom. As heated air passes up through the pipe 37, it expands into the extension 25, of the heating drum 17, and passing along inside the same, from wall 2, to wall 1, a system of circulation is set up inside the drum 17, due particularly to the position of the vent pipe 24 in the lower part of drum 17. This circulation takes place in spiral currents, as the air passes through the drum 17, and passes out of the holes 19 and 20, from whence it follows in stream lines, up against the inclined ceiling boards 63 shown in Fig. 2, and follows the arrows downward, passing through the metallic screen 47, which, not only tends to equalize the heat from the currents of air, but being metallic, also leaves the moisture contents of the air undisturbed. The air next passes down about the eggs in tray 15, at a temperature of 103° F. and through the tray 10, and goes out through cracks 62, 62, in the floor 7, and also through the spaces under the doors 5, 5.

This system of circulation is regulated by the thermostat 35, and the cover 28, with the lever 29, in the usual manner, wherein the cover 28 is automatically raised to increase the circulation of air between the pipes 37 and 45, when the temperature inside the incubator rises to about 103° F. It descends to cover extension 27, and cut off the circulation when the temperature inside has fallen to the required 103° F.

Just before the chicks hatch out, the tray 10 is lowered to the position shown in Fig. 1, and the chicks, finding their way through the opening 16, drop upon the tray 10. After all the eggs have been hatched and the chicks have dried off, one of the doors 5, is opened, and with other parts forms a brooder, such as shown in Figs. 2 and 3, wherein the curtain 61 acts to retain the heat of the incubator. The chicks are permitted to pass in and out through the curtain 61, which hangs in sections, within the brooder.

If extra brooder capacity is desired, a duplicate section can be used, such as that shown in Fig. 2, to the left, having parts marked 53ª, 54ª, 55ª, 56ª, 57ª. When it is desired to have the chicks pass in and out of the brooder, the door 56 is swung open. When this door is closed, there remains a crack at the upper part for ventilation purposes, which may also be regulated by opening the lid 57.

When cleaning the incubator brooder, the canvas 65, is rolled up inside and removed with the litter. It may be washed if desired and replaced in the device by itself or by a duplicate.

It will be noted that I adapt the ordinary method of stove-pipe and thimble construction throughout the construction of the heater, to cheapen the same, yet make it durable and also to facilitate the assembling and removing of the parts, as desired, for repairing or cleaning purposes.

Inasmuch as the details of construction of the embodiment of my invention, herein shown, may be changed, without departing from the spirit and scope thereof, I do not wish to be confined to that herein shown and described, hence I claim:

1. In an incubator, walls forming an inclosed chamber for hatching purposes, a hollow drum closed at each end, positioned at the upper part of said chamber, passing horizontally through opposite walls thereof, there being open communication through holes in the upper part of said drum with the interior of said chamber, said holes being positioned near one of the walls through which said drum passes, an extension to said drum passing beyond the wall opposite to said last mentioned wall, the end of said extension being closed, there being an opening in the upper part of said extension and one in the lower part thereof, a valve cover automatically operated, releasably closing said upper opening, an air flue communicating with said extension through said lower opening and depending therefrom, a thermostatic device for automatically regulating the operation of said valve cover through the changes of temperature on the interior of said chamber, a chimney flue passing up through said air flue, the hollow drum, and out of the end thereof opposite the said extension, the vertical part of said chimney flue being smaller in diameter than said air flue and spaced therefrom, and the horizontal part of said chimney flue passing through said hollow drum, and means for supplying heat to said chimney flue.

2. In an incubator, walls forming an inclosed chamber for hatching purposes, a hollow drum closed at each end, positioned at the upper part of said chamber, passing horizontally through opposite walls thereof, there being open communication through holes in the upper part of said drum with the interior of said chamber, a heat nonconducting coating on said drum positioned to insulate heat from the interior of said chamber, said holes being positioned near one of the walls through which said drum passes, an extension to said drum passing beyond the wall opposite to said last mentioned wall, the end of said extension being closed, there being an opening in the upper part of said extension and one in the lower part thereof, a valve cover automatically operated, releasably closing said upper opening, an air flue communicating with said extension through said lower opening and depending therefrom, a thermostatic device for automatically regulating the operation of said valve cover through the changes of temperature on the interior of said chamber, a chimney flue passing up through said air flue, the hollow drum, and out of the end thereof opposite the said extension, the vertical part of said chimney flue being smaller in diameter than said air flue and spaced therefrom, and the horizontal part of said chimney flue passing through said hollow drum, and means for supplying heat to said chimney flue.

3. A device of the character described consisting of a chamber adapted to be used as either an incubator or as a hover inclosed by walls and a roof, one of said walls being formed in part by a horizontally hinged door which when the chamber is used as an incubator lies in the plane of the rest of said wall, and, when said chamber is used as a hover in connection with a brooder secured thereto, is swung up to allow passage between said hover and said brooder and to act as a portion of the roof of said brooder.

4. A device of the character described consisting of a chamber adapted to be used as either an incubator or as a hover inclosed by walls and a roof, means for heating said chamber, one of said walls being formed in part by a horizontally hinged door to the lower edge of which is attached a curtain, which door, when said chamber is used as an incubator, lies in the plane of the rest of said wall, and, when said chamber is used as a hover in connection with a brooder secured thereto, is swung up to allow passage between said hover and said brooder, and to act as a portion of the roof of said brooder, said curtain hanging down to prevent the escape of the heat from said chamber.

Buffalo, N. Y., March 15, 1917.

JOHN R. MYERS.

Witnesses:
MILDRED MCMILLIN,
J. EDW. THEBAUD.